Figure 1:
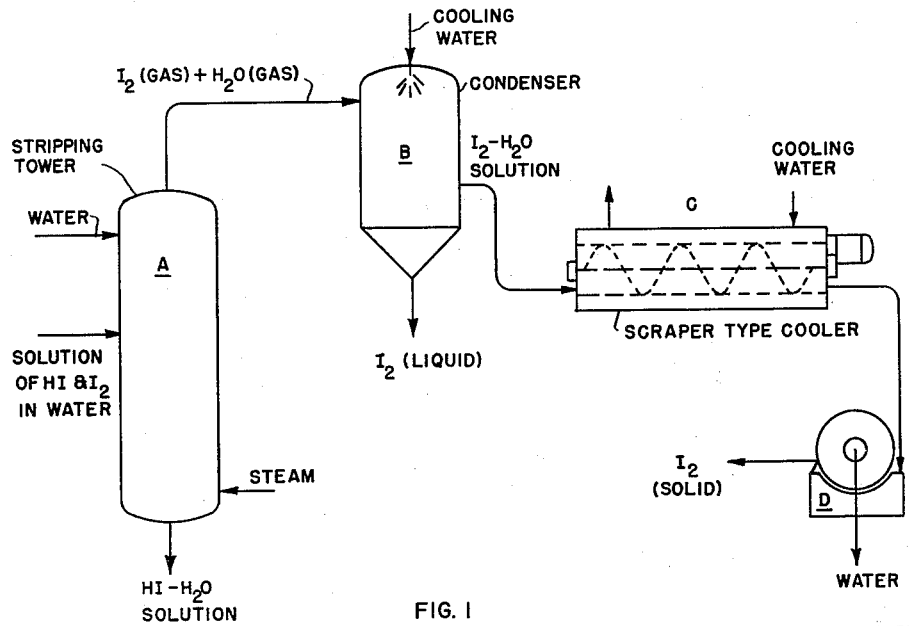

July 17, 1962  A. P. PAUL  3,044,862
PROCESS FOR RECOVERING IODINE FROM MIXTURES
OF IODINE, HYDROGEN IODIDE AND WATER
Filed April 6, 1959

INVENTOR:
ALBERT P. PAUL
BY: Alan C. Batchelder
HIS AGENT

United States Patent Office 3,044,862
Patented July 17, 1962

3,044,862
PROCESS FOR RECOVERING IODINE FROM MIXTURES OF IODINE, HYDROGEN IODIDE AND WATER
Albert P. Paul, New Brunswick, N.J., assignor to Shell Oil Company, a corporation of Delaware
Filed Apr. 6, 1959, Ser. No. 804,544
8 Claims. (Cl. 23—294)

This invention relates to a process for recovering elemental iodine from mixtures comprising water, elemental iodine and hydrogen iodide.

The art provides no completely satisfactory method for effecting the recovery of elemental iodine from mixtures comprising the components elemental iodine, hydrogen iodide and water. Elemental iodine is very soluble in solutions of hydrogen iodide in water. No effective liquid-phase or vapor-phase extraction process for separating the elemental iodine from the hydrogen iodide in such mixtures is known, for hydrogen iodide also dissolves to a significant extent in the usual solvents for iodine. Processes for separating gaseous mixtures of iodine, hydrogen iodide and water not involving absorption are not satisfactory because they involve controlled condensation techniques which require rigorous control of the temperature of the mixture to avoid condensation of the water vapor present therein, and the disadvantages arising from the presence of liquid water in contact with the mixture.

The only effective method heretofore proposed for recovering the elemental iodine content of mixtures of iodine, hydrogen iodide and water involves conversion of the hydrogen iodide content of such mixtures to elemental iodine. This method takes advantage of the fact that elemental iodine is quite insoluble in liquid water when no iodide ion is present. According to the method, substantially quantitative oxidation of the iodide ion to iodine must be effected, and the water-insoluble iodine is separated from the aqueous phase by filtration, decantation or the like. To effect substantially quantitative conversion of the iodide ion to iodine requires a very strong oxidizing agent. Normally, elemental chlorine is used (Ohman et al., Industrial and Engineering Chemistry, volume 41, pages 1547–1552 (1949)), although other oxidizing agents such as nitric acid, various nitrogen oxides, chromic acid (sodium dichromate plus sulfuric acid), hydrogen peroxide and potassium permanganate, have been proposed for this purpose. All of these materials are quite expensive and cannot be readily and economically recovered; most of these materials are very corrosive to ordinary materials of construction. Thus, processes employing these oxidizing agents do not lend themselves to the recovery of iodine from very large amounts of water-iodine-hydrogen iodide mixtures which contain substantial amounts of iodine. There is, therefore, a substantial need for a simple and effective process for recovering iodine from water-iodine-hydrogen iodide mixtures without the necessity for converting all of the hydrogen iodide to iodine and without the use of strong oxidizing agents.

Such a process has now been discovered. It is based upon the discovery that when a gas which is inert with respect to iodine is passed through a mixture comprising substantial amounts of each of the three components: water, hydrogen iodide, and elemental iodine, the effluent gas contains element iodine and water, but substantially no hydrogen iodide. That is to say, iodine is selectively stripped from the hydrogen iodide-iodine-water mixture by passing a stripping gas through the mixture. This discovery thus provides basis for a process for selectively recovering the elemental iodine from such mixtures, the product being substantially uncontaminated by hydrogen iodide. The process comprises passing a gas which is inert with respect to iodine through a condensed mixture whose components are liquid water, hydrogen iodide and elemental iodine, each in substantial amount, and recovering the elemental iodine which is contained in the effluent gas.

The new process is applicable to the selective recovery of elemental iodine from any condensed mixture comprising as its components, liquid water, hydrogen iodide and elemental iodine, each component being present in substantial amount. By "condensed mixture" is meant a mixture containing only liquid and/or solid phases—that is, non-gaseous mixtures. While condensed mixtures of hydrogen iodide, liquid water and iodine are for the most part homogeneous and liquid, it will be found that a heterogeneous mixture exists at some proportions of the three components. These heterogeneous mixtures contain a liquid phase comprising water, hydrogen iodide and iodine, and a solid phase (or liquid phase, depending upon the temperature) of iodine. The iodine in all such mixtures—including both the dissolved iodine, and that in the separate phase, if such be present—is removed selectively, according to the new process. However, where a separate iodine phase exists, it may be more convenient to remove the iodine in the separate phase by filtration, decantation, or like treatment of the heterogeneous system, and thereafter recover the dissolved iodine by the process of this invention. It must be noted that the mixtures which are treated according to this invention are defined in terms of the independent components thereof—i.e., liquid water, hydrogen iodide and iodine. Included in these mixtures are the dependent materials which may be present therein—such as hydrates, polyiodides, various ions, and the like. The terminology is used to define the intended mixtures because it definitely and accurately sets out the compositions of such mixtures without unduly restricting the definition of the mixture.

It is to be understood that the hydrogen iodide-iodine-water mixtures contemplated by this invention contain a substantial amount of each of the three components. Thus, for example, the invention does not contemplate or relate to such hydrogen iodide-water-iodine mixtures as are formed by reaction of iodine with water.

It is known, of course, that when iodine is mixed with liquid water, the iodine reacts with the water in three ways:

(1) $I_2 + H_2O \rightleftarrows 2HI + \frac{1}{2}O_2$
(2) $3I_2H_2O \rightleftarrows 5HI + HIO_3$
(3) $I_2 + H_2O \rightleftarrows HI + HIO$ Of these, reaction (1) goes strongly to the left, so that the reaction produces no significant amount of HI in an iodine-liquid water mixture. Reactions (2) and (3), especially the latter, result in there being a small amount (of the order of about $10^{-4}$ moles per liter) of hydrogen iodide in an iodine-liquid water mixture.

It also is known that iodine can be stripped from a solution of iodine in water to leave substantially pure water. This result follows from the fact that of the three reactions, only reaction (1) is not reversible, and it does not cause any significant amount of hydrogen iodide to be present. Reactions (2) and (3) are readily reversible, so that when iodine is stripped from an iodine-water mixture, both of the equilibria are upset, both of the reactions go to the left to compensate, and as a result no HI, $HIO_3$ or HIO remains in the residual water after stripping of the iodine is complete. It will be noted that as a matter of real fact, such a system really has no hydrogen iodide present, as regards the stripping of iodine from that mixture, because as the iodine stripping progresses, the hydrogen iodide concentration decreases, until there is essentially no hydrogen iodide present at the time the last of the iodine is being stripped.

The present invention deals with a quite different kind of mixture, wherein hydrogen iodide is independently present, and is not present merely because of the reversible reaction of iodine and water. In this kind of mixture, when, according to the present invention, the iodine is stripped out, the residual stripped mixture will be a solution of hydrogen iodide in water.

It was quite unexpected, and unpredicted by the prior art, that the iodine could be stripped from a mixture containing a substantial amount of hydrogen iodide, as well as a mixture wherein there in essence is no hydrogen iodide present because of the equilibria involved. Thus, hydrogen iodide is many times more volatile than is iodine, so that it would be expected on the basis of relative volatilities alone if a gas were to be passed through a mixture of hydrogen iodide, iodine and water, the effluent gas would contain hydrogen iodide, whether or not it contained iodine. Thus, the relative volatilities would predict that no separation of pure iodine could be effected through stripping the hydrogen iodide-iodine-water mixture with a gas. However, according to the present invention, it has been found in fact that the effluent gas contains iodine and not hydrogen iodide, stripping of the mixture thus resulting in clean, selective removal of the iodine.

Nor is this result predicted by relative solubility relationships. While it is known that hydrogen iodide is very soluble in water (and thus would be difficult to remove by stripping) and that iodine is but very slightly soluble in water (and thus would be relatively easily removed by stripping), the two two-component mixtures: hydrogen iodide-water, and iodine-water, are quite unlike the three-component mixture: hydrogen iodide-iodine-water, with respect to the relative solubilities of hydrogen iodide and iodine in the water. Thus, it has been found that the presence of hydrogen iodide markedly affects the solubility of iodine. In fact, it has been found that as many as two and one-half moles, or even more, of iodine can be dissolved per mole of hydrogen iodide in a mixture of hydrogen iodide and water. It also appears that the hydrogen iodide and iodine form polyiodides of the general formula $HI_x$ wherein $x$ is a whole number, these polyiodides being analogous to the known polyiodides formed between alkali metal iodides and iodine in aqueous solution. Based solely on the solubility of hydrogen iodide in water, and the solubility of iodine in water, therefore, no clear prediction could be made as to the composition of the effluent gaseous material resulting from stripping of the hydrogen iodide-iodine-water mixture with a gas, except that it would be more than probable that both hydrogen iodide and water would be present in the effluent gases. Solubility data alone thus would not predict that a clean, selective separation of the iodine could be made by means of stripping. When it is considered that the hydrogen iodide and iodine combine to form a different series of new species, thus expectably changing even further the relative solubilities and volatilities of hydrogen iodide and iodine, it is clear that the two two-component mixtures: hydrogen iodide-water, and iodine-water, are quite different—different in kind—from the three-component mixture: hydrogen-iodide-iodine-water, and thus no prediction of the behavior of the three-component mixture can be made based upon the behavior of either or both of the two-component mixtures.

Thus, if this art could be considered to teach anything at all concerning a hydrogen iodide-iodine-water mixture, it would be that stripping of such a mixture with a gas would remove both hydrogen iodide and iodine, and thus would not effect selective separation of either material from the mixture. The discovery that, instead, stripping of such a mixture with a gas effects clean, selective separation of the iodine was thus wholly unexpected.

In the hydrogen iodide-iodine-water mixtures contemplated by the invention, the weight ratio of water to hydrogen iodide (calculated on an iodine-free basis) in the mixture treated must not be less than the water-hydrogen iodide weight ratio of the constant-boiling condensed mixture comprising water and hydrogen iodide (which weight ratio is about 0.82 at atmospheric pressure), for if the water-hydrogen iodide weight ratio of the mixture treated is substantially less than this value, hydrogen iodide will also pass from the mixture into the stripping gas, contaminating the effluent gases. It is preferred that the water-hydrogen iodide weight ratio be at least 1.0, and still more preferable that the ratio be at least 1.5. The weight ratio of water to hydrogen iodide should not exceed about 50, since the hydrogen iodide content, and thus the maximum iodine content, of more dilute solutions is so small that recovery of the iodine content thereof probably would not be economically worthwhile. It is preferred that the ratio not exceed about 25.

The iodine may be present in the mixture in any concentration. However, again, it is desirable from the operational standpoint that there be a certain minimum amount of iodine present. This amount is most conveniently expressed in terms of the amount of hydrogen iodide present, and, in general, it is desirable that the weight ratio of iodine to hydrogen iodide, calculated on a water-free basis, be at least about 0.5.

Stripping of the iodine from the mixture treated can be accomplished at room temperature, but it is preferred that moderately elevated temperatures be employed. In general, at temperatures above about 40° C. optimum rates for the transfer of the iodine from the mixture to the stripping gas are attained. Also, by operating at temperatures above room temperature, the iodine in the effluent gas from the stripping zone can be conveniently removed by passing the effluent through a cooler which uses ordinary tap water, or water cooled by evaporation techniques, as coolant. The maximum temperature which normally can be used conveniently is the boiling temperature of the mixture treated. This temperature is largely dependent, of course, upon the pressure and, to a somewhat lesser extent, upon the composition of the mixture treated. It has been found that increase of the total pressure used in the stripping zone has little effect upon the rate at which iodine is stripped from the mixture, but that transfer of the hydrogen iodide from the mixture to the stripping gas is substantially reduced with increase of the total pressure. Thus, while the stripping operation may be carried out at atmospheric pressure, operation at moderately elevated pressure may be desirable. Normally, it will be found that little advantage, as regards the rate at which the iodine transfers from the mixture to the stripping gas, results from operation at temperatures above about 150° C. For operating temperatures in the preferred range of from about 40° C. to about 150° C., operation at pressures of from about 60 to about 100 p.s.i.g. will be found to give optimum iodine stripping rates, with little concurrent stripping of hydrogen iodide.

As the iodine-inert gas used as the stripping agent, there may be used any gaseous material which is substantially inert with respect to the iodine in the water-iodine-hydrogen iodide mixture and which is substantially insoluble in that mixture. Preferably the iodine-inert gas is non-condensable at the temperatures used for the stripping, or, if condensable at such temperatures, the condensate should be one in which elemental iodine is insoluble. Use of such gases as the stripping agent facilitates recovery of the iodine stripped from the liquid system. Steam is quite suitable if the stripping operation is to be carried out at moderately elevated temperatures, since iodine is but slightly soluble in water at about room temperature. Nitrogen is quite suitable, as are the inert gases such as helium, neon or the like. Vapors of various organic and inorganic materials may also be used, provided they are non-condensable at the condensation temperature of iodine and are not soluble in liquid iodine. Air, or even molecular oxygen may be used; however, under certain conditions molecular oxygen will oxidize hydrogen iodide to iodine in the liquid phase so that use of oxygen-containing gases as the stripping agent is most convenient where the conversion of a part of the hydrogen iodide of the mixture to iodine is desirable—or at least unobjectionable. The oxygen, as such or in the air, of course does not react with the iodine, and thus both oxygen and air are inert with respect to iodine and thus are suitable as the stripping gas in the process of the invention.

Physical methods and apparatus for carrying out the stripping operation are those known in the art for stripping a relatively volatile solute from a relatively non-volatile solvent. Such methods and apparatus are described, for example, in "Absorption and Extraction," Sherwood and Pigford, 2nd ed., McGraw-Hill, 1952, pages 442–551, and in "Chemical Engineer's Handbook," Perry, 3rd ed., McGraw-Hill, 1950, at section 10 thereof.

The stripping may be carried out as a batch operation, or it may be carried out continuously. Where steam is used as the stripping gas, the steam may be generated in situ—by boiling the water-iodine-hydrogen iodide mixture—or it may come from an external source.

In all cases, it is essential that intimate contact between the stripping gas and the mixture be provided, and the rate of flow of the gas through the mixture be so adjusted to the volume and physical confinement of the mixture that equilibrium conditions between the mixture and the stripping gas are approached as closely as possible. Physical entrainment of the mixture should be avoided, to prevent contamination of the effluent gases with hydrogen iodide. Known methods and apparatus for insuring intimate contact between gas and liquid phases, and attainment of equilibrium conditions can be used. For example, the stripping can be carried out by passing the gas countercurrent to the mixture in a tower packed with an inert high-area packing, a tower fitted with bubble caps, or with grid trays or the like, or the gas may be passed into a mass of the mixture with strong agitation. The stripping may be carried out by dispersing the stripping gas in the mixture in the form of a foam, or use of thin films of the mixture in contact with the gas is often more convenient—as in a wet-wall type of contactor, or a rotary disc type contactor.

The effluent gases from the stripping zone normally comprise water vapor and iodine vapor, or these two materials plus a non-condensable gas. Separation of the iodine from the effluent gases is most conveniently effected by cooling those gases and separating the condensed iodine. By controlling the temperature of the cooling zone, the iodine vapors can be condensed to a liquid without condensing any of the water vapor. This selective condensation requires rather close control of the temperature of the cooling zone within relatively narrow limits, so that it is normally more convenient to condense part or all of the water vapor as well. By proper control of the temperature of the cooling zone, two substantially immiscible liquid phases—liquid iodine and liquid water—are formed, and the iodine recovered by simple phase separation. Control of the cooling zone temperature in such a case is much less critical. However, iodine is soluble to a small, but often significant extent in water, and also has a substantial vapor pressure at such conditions; hence some iodine will be dissolved in the liquid water, and still more will remain uncondensed. Since the solubility of iodine in water and the vapor pressure of liquid iodine both decrease with decrease in temperature, it may be desirable to cool the effluent gases to room temperature or lower and recover the iodine as a solid. Since liquid iodine is physically more easily recovered and handled than is solid iodine a two-stage condensation system may be desirable. In such a system the greater part of the iodine is recovered as a liquid in a first stage and the remainder of the iodine is recovered as a solid in a second stage employing much lower temperatures.

The physical manner in which the process of this invention may be carried out is illustrated by the particular embodiment of the process represented by FIGURE 1. This particular embodiment employs a tower fitted with grid trays to effect contact between the stripping gas and the liquid system, the liquid passing downwards through the column against the flow of the gas. The gas used as stripping agent is superheated steam.

In this embodiment of the process, the solution of hydrogen iodide and iodine in water is introduced into the stripping tower A. Superheated steam is passed into the lower portion of tower A and passes upward through the tower against the descending flow of liquid. After the gases have passed through the stripping section of the tower, they are scrubbed with water, introduced into the upper portion of tower A, to remove any traces of hydrogen iodide which may be in the gases at this point. The stripping and scrubbing operations are conducted in such a way that none of the steam condenses in tower A. The effluent gases—water vapor and iodine vapor—then passes into the condenser B, wherein the vapors are cooled by direct contact with a water spray. The temperature and pressure used in the condenser are maintained at such a level that the condensed iodine is a liquid. The water-immiscible liquid iodine is withdrawn at the bottom of condenser B. The aqueous phase is withdrawn from condenser B and passed to cooler C which is equipped with scrapers to remove the solid iodine condensed therein. The aqueous phase is cooled to about room temperature, or somewhat below, and the slurry of solid iodine in water which results is passed to filter D, which separates the solid iodine from the water. The hydrogen iodide is recovered as a water solution from the bottom of tower A.

For economical operation, it is usually desirable that a portion of the water-iodine system withdrawn from the condenser B be cooled and recycled to the condenser to act as the coolant, rather than to use fresh water.

Figure 2:
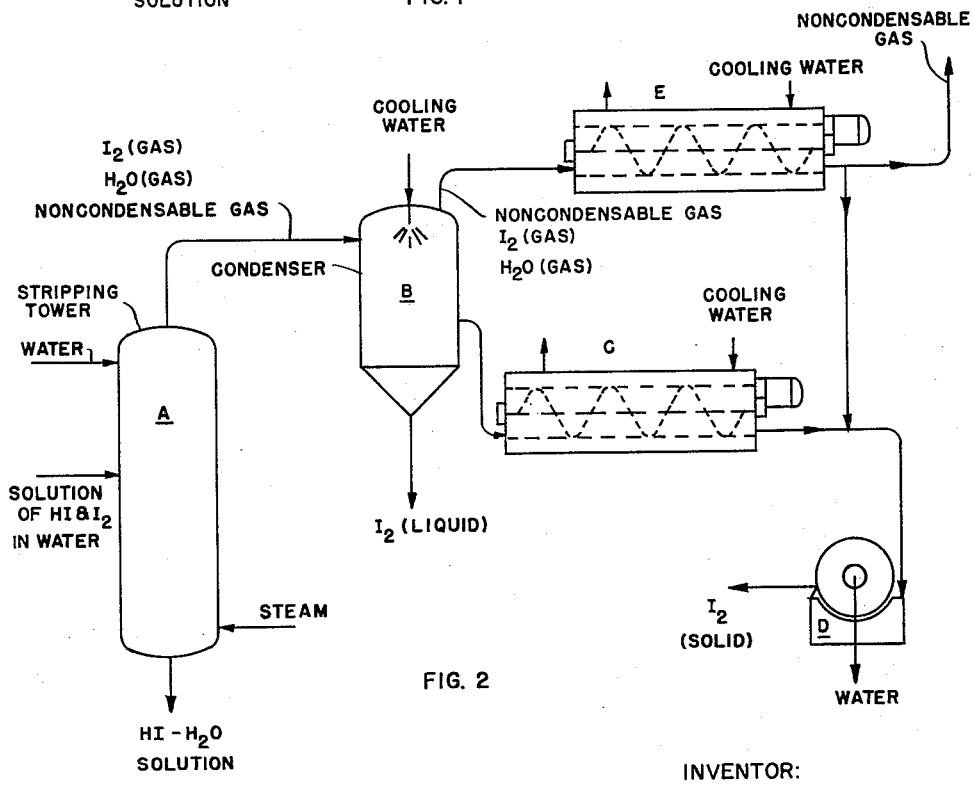

FIGURE 2 represents another specific embodiment of the process. In this embodiment, a gas which is non-condensable at the pressures and temperatures used in the process is employed as the stripping agent. This embodiment differs from that of FIGURE 1 only in that the non-condensable gas, containing water vapor and iodine vapor, is withdrawn from the top of condenser B and this gas stream must be freed of iodine. This is accomplished by passing the gaseous effluent from the condenser B through a second condenser E where the effluent is cooled to room temperature or below, the substantially iodine-free gas is vented and the water-iodine slurry is passed to filter D.

The process of the invention is illustrated by the following experiments, the results of which are summarized in Table I.

Table I

| Run No. | Composition in Kettle (grams) | | | Stripping Time (minutes) | Kettle Temperature (° C.) | Composition of Condensate (grams) | | | Percent of Iodine in Kettle Recovered |
|---|---|---|---|---|---|---|---|---|---|
| | $I_2$ | HI | $H_2O$ | | | $I_2$ | HI | $H_2O$ | |
| 1 | 46.8 | 26.8 | 170 | 15 | 93-102 | 12.6 | 0.03 | 60 | 26.9. |
| | 34.2 | 26.8 | 163 | 15 | 102 | 7.9 | 0.03 | 66 | 23.1. |
| | 26.3 | 26.8 | 155 | 10 | 102 | 4.2 | nil | 37 | 16.0. |
| | [1]22.1 | 26.7 | 150 | | | | | | total 52.8.[2] |
| 2 | 30.9 | 15.4 | 150 | 10 | 95-101 | 11.3 | nil | 197 | 31.5. |
| | 19.6 | 15.4 | 154 | 10 | 101 | 7.7 | nil | 47 | 39.3. |
| | [1]11.9 | 15.4 | 155 | | | | | | total 61.5.[2] |
| 3 | 23.0 | 11.5 | 184 | 15 | 95-101 | 5.4 | nil | 163 | 23.5. |
| | 17.6 | 11.5 | 175 | 15 | 101 | 4.6 | nil | 263 | 26.1. |
| | [1]13.0 | 11.5 | 161 | | | | | | total 43.5.[2] |
| 4 | 10.2 | 5.1 | 180 | 10 | 95-100 | 6.1 | nil | 37 | 60.0. |
| | 4.2 | 5.1 | 175 | 20 | 100 | 2.6 | nil | 54 | 61.9. |
| | [1]1.5 | 5.1 | 168 | | | | | | total 85.3.[2] |

[1] Final composition of mixture in kettle, given to complete the material balance.
[2] Percent of iodine in initial charge recovered.

In these experiments, the following procedure was used: A solution of hydrogen iodide and iodine in water of known composition was placed in a distillation kettle equipped with means for introducing an inert gas below the surface of the liquid in the kettle, with means for external heating of the kettle and with means for condensing the condensable portions of the effluent vapors from the kettle. The solution was heated to about its boiling point, and steam was passed through the solution. The effluent vapors were condensed. The condensate was analyzed for hydrogen iodide, iodine and water at intervals during the stripping. Four different test solutions, each having a different initial composition, were tested. The pertinent data and results of these experiments are set out in Table I.

Nitrogen or other chemically inert gas is equivalent to steam in these experiments. Also, while these experiments were carried out in a batchwise basis, the process of the invention may be readily carried out in a continuous manner—in fact, in the batchwise experiments set out in these examples, equilibrium conditions very probably were never attained, and since in continuous operation, equilibrium conditions could easily be obtained, even better separation of iodine from such systems would result.

Although the process of the invention is applicable to mixtures of iodine, hydrogen iodide and water obtained from any source, the process is of particular applicability to the mixtures of iodine, hydrogen iodide and water obtained from processes in which iodine is used as a reactant. For example, it has been recently discovered that elemental iodine is useful for modifying the carbon-to-carbon structure of various organic materials, particularly hydrocarbons. In this use, iodine acts as a dehydrogenating agent, removing one or more hydrogen atoms from one or more carbon atoms of the material treated; one molecule of hydrogen iodide is formed per atom of hydrogen removed. The inorganic portions of the final reaction mixtures resulting from such processes normally comprise hydrogen iodide, together with substantial amounts of elemental iodine (that unreacted in the process) and water. Water normally is present because the hydrogen iodide and iodine are conveniently recovered from the effluent from the reaction zone of these processes by scrubbing that effluent with water or a dilute aqueous solution of hydrogen iodide. Also, where the product of the dehydrogenation is highly reactive, water or steam is added to the effluent to substantially reduce the temperature of the effluent, and/or to dilute it, thus reducing side reactions between the reaction product and either or both of the iodine and hydrogen iodide. The expense of iodine requires recovery of even very small amounts of the element. The process of the present invention provides an operationally simple, efficient process for recovering the elemental iodine content of such reaction mixtures. The new process also is of value for effecting recovery of elemental iodine from the reaction mixture obtained from the liquid-phase methods used in conjunction with these dehydrogenation processes for converting the hydrogen iodide to elemental iodine. In such methods, the conversion of hydrogen iodide to iodine usually is limited by chemical equilibrium and/or reaction rate considerations to substantially less than 100%, so that recovery of iodine from iodine-water-hydrogen iodide mixtures is essential to the practical operability of such methods.

This application is a continuation-in-part of applicant's copending application Serial No. 594,893, filed June 29, 1956, now abandoned.

I claim as my invention:

1. A process for the recovery of elemental iodine from a condensed mixture comprising essentially the components elemental iodine, hydrogen iodide and liquid water, the weight ratio of water to hydrogen iodide in the mixture, calculated on an elemental iodine-free basis, lying between the water-hydrogen iodide weight ratio in the constant boiling solution of water and hydrogen iodide and 50:1, said process comprising passing an iodine-inert gas through said condensed mixture and recovering elemental iodine from the gaseous effluent.

2. A process according to claim 1 wherein the said iodine-inert gas is a molecular oxygen-containing gas.

3. A process according to claim 2 wherein the said iodine-inert gas is air.

4. A process according to claim 1 wherein the said iodine-inert gas is steam.

5. A process according to claim 1 wherein the water-hydrogen iodide weight ratio in the mixture lies between 1:1 and 25:1.

6. A process for the recovery of elemental iodine from a homogeneous liquid-phase mixture comprising essentially the components: elemental iodine, hydrogen iodide and water, the weight ratio of water to hydrogen iodide in the mixture, calculated on an elemental iodine-free basis, lying within the range of from 1:1 to 50:1, said process comprising passing an iodine-inert gas through said mixture, and recovering elemental iodine from the gaseous effluent.

7. A process for the recovery of elemental iodine from a condensed mixture comprising essentially the components elemental iodine, hydrogen iodide and liquid water, the weight ratio of water to hydrogen iodide in the mixture, calculated on an elemental iodine-free basis, being at least equal to the water-hydrogen iodide weight ratio in the constant boiling solution of water and hydrogen iodide, but not exceeding about 50:1, said process comprising steam distilling said mixture while maintaining the weight ratio between the water and the hydrogen iodide within the said limits, and recovering elemental iodine from the vapors obtained from the distillation.

8. A process according to claim 7 wherein the steam for the said steam distillation is obtained by boiling the said mixture of water, hydrogen iodide and iodine.

References Cited in the file of this patent

UNITED STATES PATENTS 1,324,761     Carter ------------------ Dec. 9, 1919

OTHER REFERENCES

McPherson and Henderson book, "A Course in General Chemistry," rev. ed., 1927, page 374, Ginn and Co., N.Y.